Jan. 28, 1936.　　　T. H. LAMBERT　　　2,028,982
HYDRAULIC TRANSMISSION MECHANISM
Filed Jan. 11, 1935　　　2 Sheets-Sheet 2
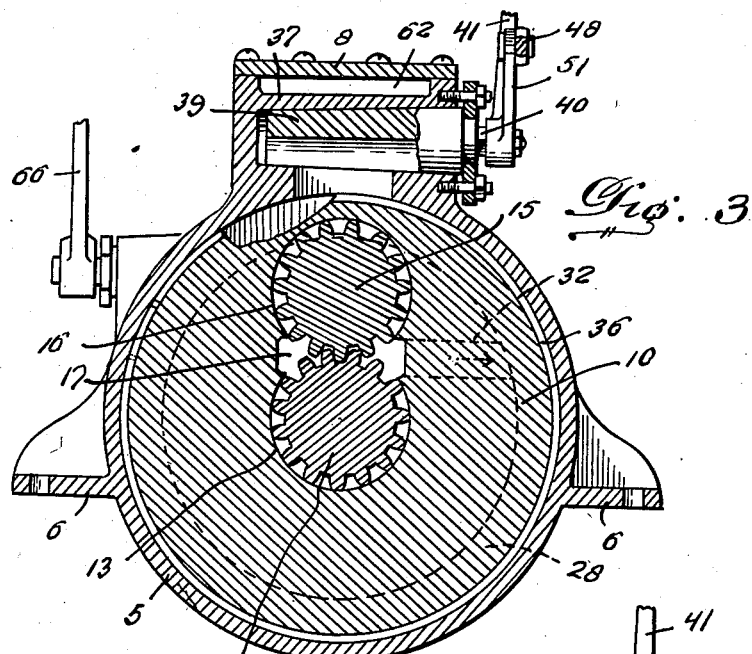
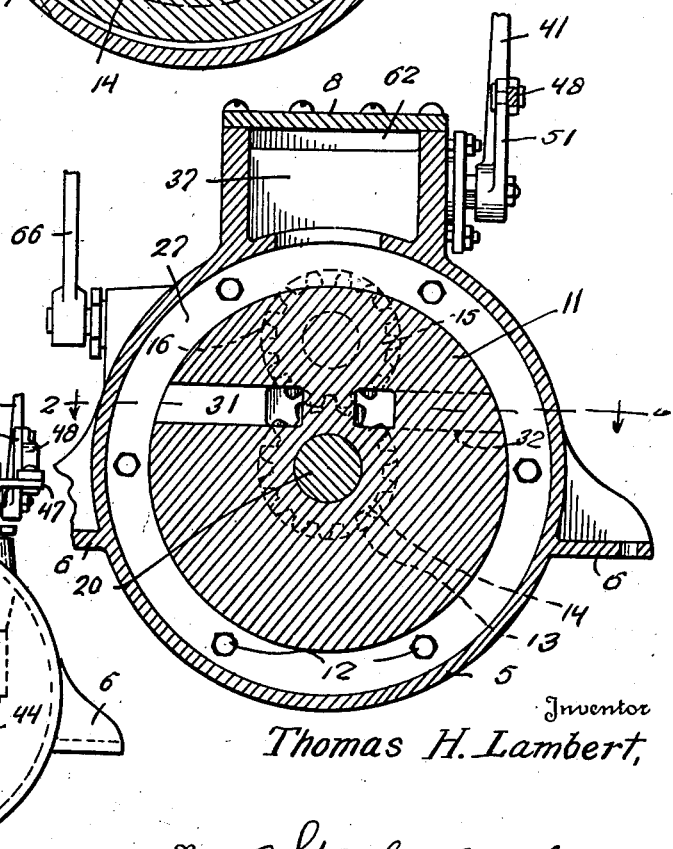
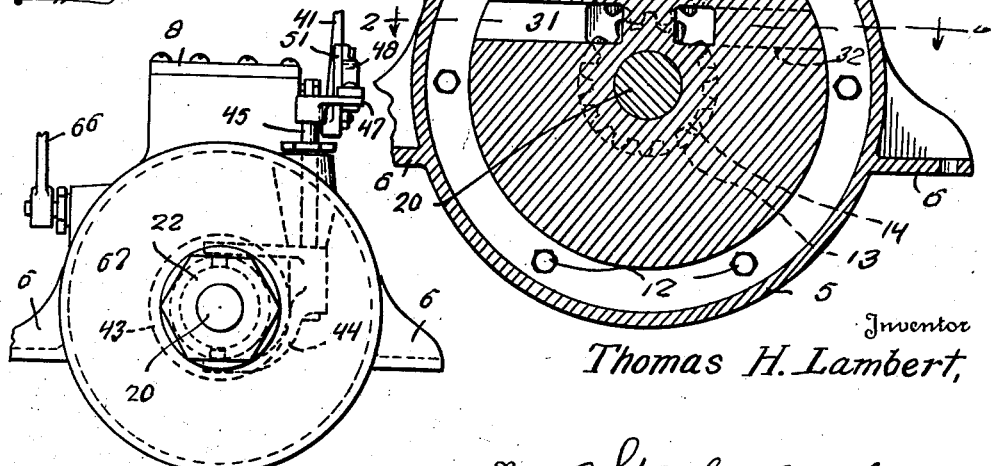
Inventor
Thomas H. Lambert,
By J. Stanley Burch
Attorney Patented Jan. 28, 1936

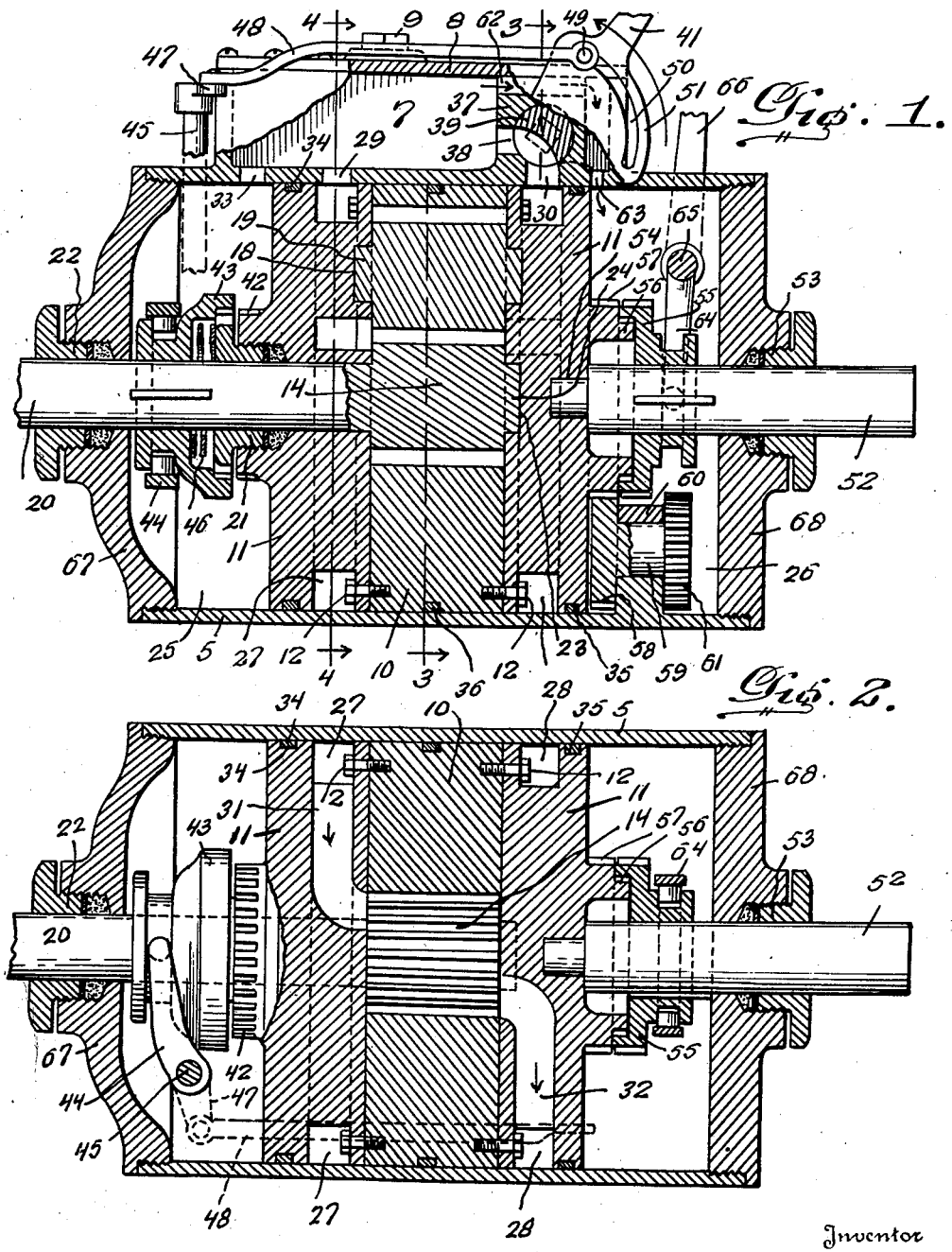

2,028,982

UNITED STATES PATENT OFFICE 2,028,982

HYDRAULIC TRANSMISSION MECHANISM

Thomas H. Lambert, Ridgewood, N. J., assignor of twelve and seventy-five one-hundredths percent to Charles S. James, Ridgewood, N. J., and twelve and seventy-five one-hundredths percent to John Mergendoller, five and one-tenth percent to Harold B. Aldrich, and twenty and four-tenths percent to Roy B. Henline, all of New York, N. Y.

Application January 11, 1935, Serial No. 1,377

6 Claims. (Cl. 192—61)

This invention relates to certain improvements in hydraulic transmission mechanisms of the gear-pump type, wherein the circulation of oil or other suitable liquid is controlled at will to vary by infinitesimal graduation the speed of a driven shaft relative to that of a driving shaft or to completely unclutch said driven shaft from said driving shaft.

Hydraulic transmission mechanisms of the present type have been heretofore proposed, particularly for use in the connection between the engine and differential gearing of a motor vehicle to take the place of the usual variable speed power transmission gearing in which the forward speeds and reverse drive are controlled by the interengagement of gears of different fixed ratios, an advantage of such hydraulic transmission mechanisms over the usual variable speed power transmission gearings being that they avoid any abrupt changes in the speed of the driven shaft and consequent excessive or sudden strains upon parts of the transmission mechanism, as well as avoiding the necessity of using a separably operable mechanical clutch between the engine and the transmission mechanism. However, hydraulic transmission mechanisms of this type which have been heretofore proposed have been more or less unsatisfactory, or for various reasons failed to meet with all of the requirements for a successful commercial use. One great objection to prior devices of this kind resided in the fact that they failed to make proper provision for preventing excessive leakage of fluid between the casing of the gear pump and the stationary housing of the mechanism axially of the latter, or from the pump casing, thereby permitting greater than tolerable slippage between the driving shaft and the casing of the gear pump, particularly at such times when the circulation of the fluid is partially or completely cut off to secure higher speeds of rotation for the driven shaft with consequent increase of pressure built up within the pump casing. Another objection to prior hydraulic transmission mechanisms of the type described is that they fail to make any provision for offsetting the objection to the unavoidable slippage which ordinarily takes place between the driving shaft and the casing of the gear pump due to fluid leakage from the pump, particularly when the circulation of fluid through the pump is nearly or completely cut off to obtain a direct drive from the driving to the driven shaft substantially at or at engine speed. Still another objection to prior hydraulic transmission mechanisms of the type in question is that they failed to make provision for retaining in the fluid circulatory system such fluid as might leak from the gear pump, particularly after the mechanism has been in long continued use. The latter objection made it necessary to frequently adjust or renew packing provided to minimize leakage from the pump and to replenish the fluid in the circulatory system at frequent intervals.

An important object of the present invention, therefore, is to provide an improved hydraulic transmission mechanism of the type specified wherein the first above-mentioned objection to prior mechanisms of that type is overcome by the provision of simple and efficient means whereby leakage of fluid between the pump casing and the housing of the transmission mechanism axially of the latter is prevented.

Another important object of the present invention is to overcome the second above-mentioned objection to prior hydraulic transmission mechanisms of the type specified, by the provision of means to automatically establish a positive mechanical driving connection between the driving shaft and the pump casing immediately subsequent to complete closing of the valve which cuts off the circulation of fluid through the pump, thus preventing any slippage of the pump casing relative to the driving shaft due to leakage of fluid from the pump, and thereby insuring driving of the driven shaft at engine speed according to the intended operation, said means being further operable to automatically free the positive mechanical driving connection between the driving shaft and the pump casing immediately prior to opening of the valve controlling the circulation of fluid through the pump and thereby permit such slippage of the pump casing relative to the driving shaft as may be desired and properly controlled by the degree of opening of said valve to secure the desired reduced speed of rotation for the driven shaft.

Still another object of the present invention is to overcome the third above-mentioned objection to prior hydraulic transmission mechanisms of the type specified, by the provision of such a mechanism wherein a chamber is provided in one end of the housing of the mechanism between said housing and the pump casing, to receive such fluid as may leak from the pump casing, said chamber being in constant communication with the fluid circulation system of the mechanism so that the leaking fluid collected therein may be retained in and supplied to such circulating system to enable the mechanism to operate over a considerably extended period of time without requiring replenishment of the fluid in the mechanism. By reason of this construction, little likelihood of leakage of fluid from the housing of the mechanism is presented because the stuffing boxes at the ends of the housing are only required to prevent outward passage of fluid which is not under high pressure and the only stuffing box which is required to resist leakage of fluid under high pressure is that provided at one side of the pump casing within the leakage collection chamber of the housing and through which the driving shaft of the mechanism extends. Obviously, as the latter stuffing box is located within the housing a slight amount of leakage from the pump casing will be relatively immaterial and will result in absolutely no loss of fluid from the mechanism or lowering of the fluid in the circulatory system.

A further object of the present invention is to provide an improved transmission mechanism of the above kind wherein a manually operable gearing is provided within the housing of the mechanism so that the gears thereof will be constantly immersed in the oil of the circulatory system for efficient lubrication and silent operation, such gearing providing means operable at will to change the direction in which the driven shaft is rotated by the pump casing and thereby provide for reverse drive such as is required to cause backward travel of a motor vehicle.

Other objects of the present invention is to provide an improved transmission mechanism of the character specified above which is extremely simple and durable in construction, efficient in use, economical to manufacture, and otherwise constructed to meet with all of the requirements for a successful commercial use.

The above and other objects are accomplished by the construction hereinafter more fully described, shown in the accompanying drawings, and claimed.

In the drawings:

Figure 1 is a view partly in side elevation and partly in central longitudinal section, of one form of hydraulic transmission mechanism embodying the present invention.

Figure 2 is a horizontal sectional view thereof taken mainly on a plane indicated by the line 2—2 of Figure 4.

Figure 3 is a transverse vertical section on line 3—3 of Figure 1.

Figure 4 is a transverse vertical section on line 4—4 of Figure 1; and

Figure 5 is an end elevation, drawn on a reduced scale, of the complete mechanism and means looking toward the right of Figure 1.

Referring more in detail to the drawings, the illustrated embodiment of the invention includes a cylindrical housing 5 provided at opposite sides with rigid brackets 6 whereby said housing may be securely fastened to a support, such as the frame of a motor vehicle. Formed on the top of the housing 5 is a fluid or oil reservoir 7 having a removable cover plate 8 and provided with a suitable filling opening closed by a removable plug 9.

Rotatably fitted within the housing 5 intermediate the ends of the latter is a gear pump having a casing consisting of a cylindrical body 10 and side plates 11 bolted as at 12 to opposite sides of said body. The body 10 and side plates 11 are of similar diameters and have a snug but rotating fit within the housing 5, said body 10 further having an axial substantially cylindrical bore 13 forming a chamber within which is rotatably fitted a gear piston 14 meshing with a second gear piston 15 rotatably fitted in another substantially cylindrical bore 16 provided in the body 10, in a manner generally old and well known in the gear pump art. It will be noted that the bores 13 and 16 are adjacent and slightly intersect each other at adjacent sides so that they communicate as at 17 where the gear pistons mesh with each other. The bores 13 and 16 are closed at their opposite ends by the side plates 11, and the latter are provided in their inner faces with opposed cylindrical recesses 18 in which are journaled the stub shafts 19 provided on opposite ends of the gear piston 15. The axial gear piston 14 is rigid with the rear end of a driving shaft 20 which extends forwardly through and is journaled in the adjacent side plate 11, as well as through a stuffing box 21 carried by the latter and a further stuffing box 22 carried by the front end wall of housing 5. The projecting forward end of shaft 20 is adapted to be directly driven by a motor such as the engine of a motor vehicle, and the rear side plate 11 of the pump casing is formed in its inner face with a central recess 23 in which is journaled the stub shaft 24 provided on the rear end of the axial gearing 14. It will thus be apparent that the main opportunity for leakage of fluid from the pump casing is forwardly through the forward side plate 11 between the driving shaft 20 and the aperture of said forward side plate 11, and thence through stuffing box 21. However, the arrangement of the gear pump intermediate the ends of housing 5 provides chambers 25 and 26, respectively in front of and rearwardly of said gear pump, the stuffing box 21 being positioned within the front or forward chamber 25 so that any fluid leaking therethrough from the interior of the pump casing will be caught in said chamber 25, for a purpose which will presently be described.

The side disk members 11 of the pump casing are respectively provided with annular peripheral grooves 27 and 28 in constant communication with the reservoir 7 through ports 29 and 30 provided in the top of housing 5. The side plate members 11 of the pump casing are further provided with passages 31 and 32 which extend inwardly from the respective grooves 27 and 28 and place the latter in constant communication with the piston bores 13 and 16 where they intersect and communicate with each other at 17, but at opposite ends of said bores as clearly shown in Figures 2 and 4. Thus, regardless of the rotated position of the pump casing with respect to the housing 5, the piston bores or chambers of said pump will be in constant communication with the ports 29 and 30, respectively for the intake of fluid to and the exhaust of fluid from the pump casing. As the ports 29 and 30 communicate with the reservoir 7 through the top of housing 5, there is provided a fluid circulatory system in which the reservoir 7 is included, and the leakage-receiving chamber 25 in the forward end of housing 5 is placed in communication with the reservoir 7 through another port 33 in the top of housing 5, whereby any fluid leaking from the pump casing, and consequently from the fluid circulatory system, by way of stuffing box 21, may be returned from chamber 25 to said reservoir 7, and consequently to the fluid circulatory system.

With the construction described, provision must be made to prevent leakage of fluid from grooves 27 and 28 to each other or to the chambers 25 and 26 between the pump casing and the housing 5. For this purpose, the side plate members 11 are provided at the outer sides of grooves 27 and 28 with peripheral annular grooves in which are arranged packing rings 34 and 35, and the body member 10 of the pump casing is provided between the grooves 27 and 28 with an annular peripheral groove in which is arranged a packing ring 36.

Manually operable means is provided for controlling the fluid circulation in the system, at will, in such manner that the speed at which the casing of the gear pump is driven by the driving shaft 20 may be regulated by infinitesimal graduation, or whereby free circulation of the fluid may be permitted to allow the driving shaft 20 to rotate independently of the pump casing. For this purpose, the reservoir 7 is provided with an internal valve casing 37 having a fluid passage 38 arranged to provide a communication directly between the exhaust port 30 and the discharge passage 32 of the pump with the reservoir 7, the degree of opening or closing of such passage 38 being controlled by a rotatable plug or valve body 39 fitted in a chamber of the valve casing 37 intersected by the passage 38. The rotatable valve member 39 has an operating shaft 40 which projects outwardly through one side of the reservoir 7 where it is equipped with a suitable operating lever or handle 41.

The forward side plate member 11 of the pump casing is formed with a projecting hub provided with peripheral gear teeth 42, and slidably keyed on the driving or power shaft 20 is an internal gear 43 arranged to be shifted into or out of mesh with the teeth 42 of this hub gear. The desired shifting of ring gear 43 may be effected by any suitable means such as a shifting fork 44 pivotally mounted within the forward end of housing 5 and carried by a rock shaft 45 which projects upwardly through the top of housing 5 and is operatively connected with the operating lever or handle 41 of valve member 39. An essential characteristic of the construction, however, is that means must be provided to permit complete closing of valve member 39 while the internal gear 43 is disengaged from the teeth 42, but to cause shifting of the internal gear 43 into engagement with the teeth 42 as soon as the valve member 39 is closed and upon further movement of said valve member 39 while in closed position. Another characteristic of this construction is that it must cause disengagement of internal gear 43 from teeth 42 before the valve member 39 begins to open and when said valve member 39 is turned to ultimately open the same. For this purpose, a spring 46 may be provided which constantly acts to yieldingly shift the internal gear 43 forwardly out of engagement with the teeth 42, and the operative connection between the upper end of rock shaft 45 and the operating lever or handle 41 of valve member 39 may consist of a crank arm 47 secured on the upper end of rock shaft 45 and having one end of a link 48 pivoted thereto the other end of link 48 having a lost motion connection with lever or handle 41, consisting, for example, in a pin 49 rigid with and projecting laterally from the rear end of link 48 and engaging in an arcuate slot 50 provided in a segment 51 formed on the inner end of lever or handle 41. With this construction, it will be seen that lever or handle 41 may be swung to the left of Figure 1 to cause complete closing of valve member 39 without causing movement of link 48 and therefore allowing the internal gear 43 to remain in the disengaged position of Figure 1. At the same time, it will be seen that as soon as the valve member 39 is completely closed, the pin 49 will engage the lower end wall of slot 50, and upon further movement of lever 41 to the left of Figure 1 will cause shifting of link 48 in a manner to move internal gear 43 rearwardly into engagement with the teeth 42, said valve member 39 remaining closed during this continued forward movement of lever 41. The purpose of this arrangement is to provide a positive mechanical driving connection between the driving or power shaft 20 and the casing of the gear pump so that the latter will actually be driven at engine speed or at the same speed as shaft 20 when the valve member 39 is completely closed to stop the circulation of fluid in the circulatory system, but to destroy this mechanical and positive driving connection between the shaft 20 and the casing of the gear pump when the valve member 39 is turned in a direction to open the same and before said valve member 39 has been turned in that direction a sufficient distance to cause initial opening of said valve member. Theoretically, when the valve member 39 is completely closed and discharge of fluid from the pump is completely prevented, the casing of the gear pump will be locked and caused to turn with shaft 20 and gear piston 14 at the same speed as the latter. However, in actual practice, this is found to not be so because some leakage of fluid from the pump cannot be prevented in view of the enormous pressure which is built up behind the closed valve 39. This is particularly true after continued use of the mechanism and when the mechanism is used for driving under heavy load, such continued use of the mechanism naturally resulting in wear of parts such as will permit fluid leakage from the pump. Any such leakage will of course result in some slippage between the pump casing and the driving shaft 20, so that in actual practice the pump casing, and the driven shaft connected thereto as will be presently described, will rotate at a lower speed than the driving shaft 20. By engaging internal gear 43 with teeth 42, a positive driving connection is had at this time insuring rotation of the pump casing and the driven shaft exactly at the same speed as that of driving shaft 20, and engagement of gear 43 with teeth 42 may be readily effected after complete closing of valve 39 due to the fact that the casing of the gear pump has attained nearly the same speed of rotation as that of shaft 20 at such time. When it is desired to drive the pump casing and the driven shaft at a lower speed than that of shaft 20, the valve 39 will be open to a degree depending upon the speed desired for the driven shaft. Naturally, at the latter times, there must be no positive mechanical driving connection between shaft 20 and the casing of the gear pump, and as soon as the operating lever 41 of valve 39 is swung to the right of Figure 1, the spring 46 is permitted to shift internal gear 43 out of engagement with teeth 42 before the valve 39 has begun to open. By continuing the movement of lever 41 to the right of Figure 1, valve 39 may be completely opened as shown in that figure, thereby permitting free circulation of fluid to and from the pump by way of reservoir 7, thus permitting shaft 20 to drive gear piston 14 and gear piston 15 rapidly without imparting any motion to the casing of the gear pump or to the driven shaft operatively connected to the latter which, as before stated, will be presently described.

A driven shaft 52 extends through a stuffing box 53 into the rear portion of housing 5 where it has a reduced forward end journaled in a recess as at 54 provided centrally of and in the outer side of the rear side plate member 11 of the pump casing. Slidably keyed on the driven shaft 52 is a combined internal and external gear 55 adapted to have its internal teeth meshed with the toothed portion 56 of a double gear rigid with the rear side plate member 11 of the pump casing, so as to provide a direct drive between said pump casing and the driven shaft 52. The double gear just mentioned also includes a second toothed portion 57 constantly meshing with a further gear 58 secured to a shaft 59 which is journaled at 60 in the bottom of the rear housing chamber 26. Still another gear 61 is fixed to the shaft 59 and arranged to be meshed with the external teeth of gear 55 when the latter is shifted rearwardly out of engagement with the toothed portion 56 of the double gear. Thus, gear 55 may be disengaged from the toothed portion 56 of the double gear and disposed intermediate the gears 58 and 61, at which time the driven shaft 52 will be freed of connection with the pump casing. At the same time, further rearward movement of gear 55 will cause the latter to mesh with gear 61 so that a reverse driving connection is then had between the pump casing and the driven shaft 52 by way of gear portion 57, gear 58, gear 59, gear 61, and gear 55. In this way the shaft 52 will be directly driven in one direction when the gear 55 is engaged with the toothed portion 56 of the double gear rigid with the pump casing, and when gear 55 is disengaged from the toothed portion 56 and meshed with gear 61, the driving connection between the pump casing and shaft 52 is such as to drive the latter in the opposite direction from that in which the pump casing is driven. The latter obviously provides the reverse drive necessary to cause backward travel of motor vehicles. It will be noted that the reverse gearing just described is located within the chamber 26 of the housing 5, which chamber is supplied with oil from reservoir 7 through a passage 62 provided between the top and rear walls of reservoir 7 and the corresponding walls of valve casing 37, said passage being placed in communication with chamber 26 by means of a port 63 in the top of housing 5. The gears of the reverse gearing are thus bathed in oil at all times for efficient lubrication and silent operation. Any suitable means may be provided for manually shifting the slidable gear 55, such as a shifting part 64 carried by a rock shaft 65 which projects laterally through one side of housing 5 where it is provided with an operating handle or lever 66.

The housing 5 preferably consists of a cylindrical body portion and detachable end walls 67 and 68 respectively provided with the stuffing boxes 22 and 53. While these end walls 67 and 68 are shown threaded into the ends of the housing body, they may be detachably secured in place in any well known or preferred manner, the essential feature being that they are detachable or removable to facilitate access to the parts of the mechanism enclosed within the housing 5, for renewal or repair.

In use, the housing 5 and reservoir 7 may be entirely filled with oil so that the parts are bathed in a lubricant to run smoothly and noiselessly. When the lever 41 is thrown to one extremity, the valve plug 39 will be completely opened and the gear 43 will be disengaged from teeth 42 as shown in Figure 1. With the valve plug 39 completely open, the passage of oil into and out of the pump is unimpeded so that the driving or power shaft 20 may rapidly rotate the gear pistons 14 and 15 without imparting any motion to the casing of the pump. The pump casing and the driven shaft 52 are thus allowed to remain still to correspond to the operation which takes place when the gear shift lever of an ordinary transmission gearing is in neutral position. However, if the lever 41 is drawn to the left of Figure 1 to partially close the valve member 39, the flow of fluid from the pump will be impeded to a degree corresponding to the degree of closing of valve member 39, and the rotation of driving or power shaft 20 will then be communicated to the pump casing and driven shaft 52, to a certain degree. The direction in which driven shaft 52 is turned will of course depend upon whether gear 56 is positioned as in Figure 1 to afford a direct driving connection between the pump casing and said shaft 52, or shifted rearwardly into mesh with gear 61 to provide an indirect reverse driving connection between said pump casing and said shaft 52. When the lever or handle 41 is thrown to the other extreme, or to the extreme left position as viewed in Figure 1, valve member 39 will be completely closed and the gear 43 will have been engaged with teeth 42 immediately after complete closing of said valve member 39. As soon as valve member 39 has been completely closed, the passage of oil or fluid from the pump will be entirely checked except for what leakage may occur, thereby causing the pump casing to rotate substantially in unison with the driving or power shaft 20. However, any lag or slippage which may occur between the pump casing and shaft 20 due to leakage of oil or fluid from the pump will be positively overcome by further turning of valve 39 for a slight distance such as is necessary to cause the engagement of gear 43 with the hub gear 42 of the pump casing. As before mentioned, the engagement of gear 43 with the hub teeth 42 provides a positive mechanical driving connection between the power shaft 20 and the gear casing when the valve 39 is completely closed, thereby insuring that the pump casing will be driven at the same speed as shaft 20 when the circulation of fluid is stopped by closing of valve 39 and even though there may be such fluid from the pump as to otherwise result in turning of the pump casing at a slightly lower speed than that of the shaft 20. However, when the lever 41 is again operated to turn valve 39 to open position, the gear 43 will be disengaged from teeth 42 immediately in advance of the time that valve 39 begins to open, thereby destroying the positive mechanical driving connection between the driving shaft 20 and the pump casing in advance of permitting restricted fluid circulation for the purpose of allowing slippage of the pump casing relative to the driving shaft 20 to secure rotation of said pump casing at a lower speed than that of said shaft 20.

It will be noted that the oil in chambers 25 and 26 will be under very low or substantially no pressure so that little likelihood of leakage of oil or fluid from housing 5 is presented because of the stuffing boxes 22 and 53 through which the shafts 20 and 52 extend. Also, the packing rings 34, 35 and 36 effectively prevent leakage of high pressure fluid from groove 28 to groove 27 or from grooves 27 and 28 to the chambers 25 and 26 between the pump casing and housing 5. Any fluid leaking from the pump casing by way of gland 21 will be caught in chamber 25 and returned to the circulating system by way of port 33, so that constant attention to stuffing box 21 is made unnecessary. In other words, leakage through stuffing box 21 will be of practically little or no disadvantage up to a predetermined extent.

It will of course be understood that when valve 39 is fully opened, the shaft 20 and the casing of the pump are entirely disconnected from each other and the gear piston 15 is revolved freely by the gear piston 14 while the pump casing remains stationary along with the driven shaft 52.

It will be obvious that changes in details of construction might be adopted without departing from the principle of my invention, the illustrated embodiment of the invention being shown merely by way of example.

What I claim as new is:

1. In a hydraulic transmission mechanism, the combination of a stationary housing, driving and driven shafts extending into said housing, a gear pump having a casing mounted for free rotation on said driving shaft within said housing, said gear pump further including a drive gear fixed to said driving shaft, means providing an operative connection between said pump casing and said driven shaft, said housing and said pump casing having passages to provide for fluid circulation between said housing and said pump, a valve associated with the discharge passage of said pump to control the passage of liquid therethrough at will, means to provide a releasable positive mechanical driving connection between said driving shaft and the casing of said pump, and means including an operative connection between said last-named means and said valve for operating the said last-named means to establish said positive mechanical driving connection automatically upon continued operation of said valve immediately subsequent to complete closing of said valve and while said valve is closed.

2. In a hydraulic transmission mechanism, the combination of a stationary housing, driving and driven shafts extending into said housing, a gear pump having a casing mounted for free rotation on said driving shaft within said housing, said gear pump further including a drive gear fixed to said driving shaft, means providing an operative connection between said pump casing and said driven shaft, said housing and said pump casing having passages to provide for fluid circulation between said housing and said pump, a valve associated with the discharge passage of said pump to control the passage of liquid therethrough at will, means to provide a releasable positive mechanical driving connection between said driving shaft and the casing of said pump, and means including an operative connection between said last-named means and said valve for operating the said last-named means to establish said positive mechanical driving connection automatically upon continued operation of said valve immediately subsequent to complete closing of said valve and while said valve is closed, and for automatically releasing said positive mechanical driving connection upon movement of the valve to open position and immediately prior to initial opening of said valve.

3. In a hydraulic transmission mechanism, the combination of a stationary cylindrical housing affording a liquid reservoir, a gear pump having a cylindrical casing rotatably fitted in said housing in spaced relation to an end of the latter to provide a leakage receiving chamber in said housing between the pump casing and said end of the housing, there being fluid circulatory passages between said pump and said reservoir including intake and discharge passages for the pump, a valve associated with said discharge passage to control the flow of liquid therethrough at will, driving and driven shafts extending into said housing, said pump casing being mounted for free rotation on said driving shaft, said pump including a drive gear fixed to said driving shaft, said pump casing having a stuffing box through which said driving shaft extends and arranged so that fluid leaking therethrough will flow directly into said leakage receiving chamber, said leakage receiving chamber being in constant communication with said fluid reservoir, said housing having stuffing boxes through which said driving and driven shafts extend, and means to provide a driving connection between the pump casing and said driven shaft.

4. In a hydraulic transmission mechanism, a stationary cylindrical housing, a fluid reservoir provided on the top of said housing, driving and driven shafts extending into said housing, a gear pump arranged in said housing intermediate the ends of the latter to provide chambers in the housing at opposite sides of said pump, said pump including a cylindrical casing rotatably fitted in the housing and mounted for free rotation on the driving shaft, said pump further including a drive gear fixed to said driving shaft, said fluid reservoir and the chambers in the housing at opposite sides of the pump being in constant communication, said pump casing further having annular peripheral grooves and intake and discharge passages extending inwardly from the respective ones of said grooves, said housing having ports providing communication between said grooves and said fluid reservoir to permit circulation of fluid between said reservoir and said pump, annular peripheral packing rings affording fluid tight joints between said housing and said pump casing between and at the outer sides of said peripheral grooves, means to provide a driving connection between said pump casing and said driven shaft, and a valve associated with said discharge passage to control the flow of fluid therethrough at will.

5. In a hydraulic transmission mechanism, a stationary cylindrical housing, a fluid reservoir provided on the top of said housing, driving and driven shafts extending into said housing, a gear pump arranged in said housing intermediate the ends of the latter to provide chambers in the housing at opposite sides of said pump, said pump including a cylindrical casing rotatably fitted in the housing and mounted for free rotation on the driving shaft, said pump further including a drive gear fixed to said driving shaft, said fluid reservoir and the chambers in the housing at opposite sides of the pump being in constant communication, said pump casing further having annular peripheral grooves and intake and discharge passages extending inwardly from the respective ones of said grooves, said housing having ports providing communication between said grooves and said fluid reservoir to permit circulation of fluid between said reservoir and said pump, annular peripheral packing rings affording fluid tight joints between said housing and said pump casing between and at the outer sides of said peripheral grooves, means to provide a driving connection between said pump casing and said driven shaft, a valve associated with said discharge passage to control the flow of fluid therethrough at will, the means to provide a driving connection between the pump casing and the driven shaft comprising a reversing gearing consisting of a double gear rigid with the pump casing, spaced gears journaled in the bottom of the housing, and a combined internal and external gear slidably keyed on said driven shaft and manually shiftable at will to engage its internal teeth with one set of teeth of said double gear or to disengage the same from said one set of teeth and engage its external teeth with one of said spaced gears, the other set of teeth of said double gear being in constant mesh with the other of said spaced gears.

6. In a hydraulic transmission mechanism, a stationary cylindrical housing, a fluid reservoir provided on the top of said housing, driving and driven shafts extending into said housing, a gear pump arranged in said housing intermediate the ends of the latter to provide chambers in the housing at opposite sides of said pump, said pump including a cylindrical casing rotatably fitted in the housing and mounted for free rotation on the driving shaft, said pump further including a drive gear fixed to said driving shaft, said fluid reservoir and the chambers in the housing at opposite sides of the pump being in constant communication, said pump casing further having annular peripheral grooves and intake and discharge passages extending inwardly from the respective ones of said grooves, said housing having ports providing communication between said grooves and said fluid reservoir to permit circulation of fluid between said reservoir and said pump, annular peripheral packing rings affording fluid tight joints between said housing and said pump casing between and at the outer sides of said peripheral grooves, means to provide a driving connection between said pump casing and said driven shaft, and a valve associated with said discharge passage to control the flow of fluid therethrough at will, said means to provide a driving connection between the pump casing and said driven shaft comprising a reversing gearing arranged in an end chamber of the housing at one side of said pump and including a gear rigid with said pump casing.

THOMAS H. LAMBERT.